United States Patent Office 3,169,955
Patented Feb. 16, 1965

3,169,955
PROCESS FOR THE MANUFACTURE OF AZO-PIGMENTS HAVING AN IMPROVED FLOW-ABILITY
Arthur Siebert, Frankfurt am Main, Erich Dietz, Kelkheim, Taunus, and Georg Geihsler, Frankfurt am Main, Germany, assignors to Farbwerke Hoechst Aktiengesellschaft vormals Meister Lucius & Brüning, Frankfurt am Main, Germany, a corporation of Germany
No Drawing. Filed May 23, 1961, Ser. No. 111,906
Claims priority, application Germany, May 28, 1960,
F 31,326
3 Claims. (Cl. 260—176)

The present invention provides a process for the manufacture of azo-pigments with improved flowability.

As it is known in the art, the field of application of a pigment dyestuff is determined by its fastness properties, such as fastness to light, fastness to solvents, fastness to overspraying and fastness to bleeding or to heat. Besides, however, properties closely connected with the size and shape as well as with the surface structure of the single particles are of great importance. These last-mentioned properties determine, to a high degree, the rheological properties of the printing pastes prepared from these pigments. A pigment, the rheological properties of which have reached disadvantageous extreme values, may not be suitable for many fields of application. The rheological properties of a pigment may be measured by the so-called oil absorption and by measurements of the viscosity of a printing colour prepared with the pigment in question, for example an intaglio printing colour, with a Ford viscosimeter.

The oil absorption of a pigment is determined in a manner such that 1 gram of a dyestuff is finely ground on a roughened glass plate, while linseed oil is added dropwise until the greasing point is reached, i.e. when—on mixing pulverulent pigment dyestuff with increasing quantities of linseed oil—the initial crumbly mixture has become a uniform, brushable mass. The consumption of linseed oil is then read off from a buret and calculated on 100 grams of dyestuff.

Normally, the oil absorption amounts of 60–70 milliliters of linseed oil/100 grams of dyestuff; these values may, however, rise above 100 milliliters of linseed oil/100 grams of dyestuff, as it is shown in the following table. The oil absorption of a pigment dyestuff determines decisively the viscosity or the flowability of the printing colours prepared with this dyestuff. Low oil absorptions generally involve low viscosities or a good flowability and vice versa. The viscosity of a printing colour, however, may also be determined directly. For this purpose, in practice the so-called Ford viscosimeter is used, i.e. a funnel-shaped metal vessel into the bottom of which a standardized nozzle may be inserted. From the pigment dyestuff to be examined, an intaglio printing colour is prepared and the time which is necessary for a certain amount of this printing colour to flow through the nozzle is measured in seconds. High measuring values correspond to high viscosities, i.e. to poor flowability. Dyeing pastes as they are used in offset printing cannot be used for these measurements because they are too viscous. When the oil absorption of a pigment dyestuff is very high, the intaglio printing colour prepared with this dyestuff can become so viscous that a measurement is no longer possible (cf. dyestuff 12 of the table).

The following table indicates the oil absorptions (in milliliters of linseed oil/100 grams of dyestuff) and the viscosity values determined in the Ford viscosimeter (in seconds) of some mono- and disazo dyestuffs.

| Dyestuff | Oil absorption (ml. of linseed oil/100 grams of dyestuff) | Viscosity (seconds) |
|---|---|---|
| 2-chloro-4-nitraniline ⟶ β-naphthol | 60 | 30 |
| 2:4-dinitraniline ⟶ β-naphthol | 62 | 31 |
| 4-nitraniline ⟶ β-naphthol | 62 | 45 |
| 4-chloro-2-nitraniline ⟶ 1-acetoacetylamino-2-chlorobenzene | 64 | 34 |
| 3-nitro-4-aminotoluene ⟶ acetoacetylaminobenzene | 66 | 70 |
| 3-nitro-4-aminotoluene ⟶ β-naphthol | 74 | 26 |
| 2:4:5-trichloroaniline ⟶ 1-(2':3'-hydroxynaphthoylamino)-2-methylbenzene | 82 | 64 |
| 5-chloro-2-amino-toluene ⟶ 1-(2':3'-hydroxynaphthoylamino)-4-chloro-2-methylbenzene | 86 | 120 |
| 3:3'-dichlorobenzidine ⇌ 2 mols of 1-acetoacetylamino-2:4-dimethylbenzene | 85 | 136 |
| 3:3'-dichlorobenzidine ⇌ 2 mols of 1-acetoacetylamino-4-chloro-2:5-dimethoxybenzene | 94 | 120 |
| 3:3'-dichlorobenzidine ⇌ 2 mols of acetoacetylaminobenzene | 96 | 98 |
| 3:3'-dichlorobenzidine ⇌ 2 mols of 1-acetoacetylamino-2-methoxybenzene | 114 | (¹) |

¹ No longer measurable.

The industrial application of pigments having an oil absorption of 80 and more millimeters of linseed oil/100 grams of dyestuff and yielding printing colours with high viscosity values is very difficult. When printing colours are prepared from such pigment dyestuffs according to the usual recipes and, when these printing colours are used for offset and intaglio printing, objectionable prints are obtained because—due to their high viscosity—they have disadvantageous printing properties. This becomes evident, for example by the fact that in offset printing the printing colour does not adhere to the printing rollers, i.e. that the printing rollers do not take up enough dyestuff. The more rapidly the modern printing machines run, the more unfavorable is the effect of high viscosities or of poor flowability of the printing colours.

The flowability of a printing colour may, indeed, be increased by the addition of binding agents or solvents. This, however, is possible only to a certain degree; above this limit the loss of dyestuff concentration, i.e. of tinctorial strength is no more tolerable. The manufacturers of printing colours, therefore, look for pigments possessing a high tinctorial strength which, in concentrations as high as possible and with an acceptable viscosity, yield strong printing colours.

In the technical literature reference is made to these unfavorable properties of various pigment dyestuffs. Thus F. M. Smith states in "Paint Manufacture," August 1957, page 296, that the coupling product of 1 mol of tetrazotized 3:3'-dichlorobenzidine with 2 mols of 1-acetoacetylamino-2-methoxybenzene (cf. dyestuff 12 of the above table) possesses poor printing properties which, as G. Wormald explains in "Paint and Varnish Production," April 1957, page 56, are common to all benzidine-yellow dyestuffs (cf. dyestuffs 9 and 12 of the above table), and which are due to the high oil absorptions characteristic of these dyestuffs. In addition to the benzidine-yellow dyestuffs other pigments equally show high oil absorptions and high viscosities (cf. dyestuffs 7 and 8 of the above table).

The present invention is based on the observation that azo pigments which possess a high oil absorption and the printing pastes of which are very viscous, can be prepared with an improved flowability, i.e. in a form which is free from the above mentioned disadvantageous properties, by treating the azo pigments, while in an aqueous suspension and during or after manufacture, at an elevated temperature with a water-insoluble organic solvent in a proportion ranging from about 2 to 25% of the weight of the azo dyestuff of 100% strength, if desired with the addition of an emulsifier. As solvents there may be used for the process according to the present invention, for example benzene, toluene, xylene, chlorobenzene, bromobenzene, dichlorobenzene, trichlorobenzene, nitrobenzene, chloronaphthalene, quinoline, acetonitrile, methylchloroform, benzylcyanide and benzoic acid alkyl esters. The treatment may be carried out at a temperature between 40 and 100° C. for a period of time of some minutes up to 2 to 3 hours. Depending on the reaction conditions used the properties of the pigments may be modified within wide limits. As emulsifiers all compounds are suitable with the aid of which emulsions can be prepared from the above mentioned organic solvents and water and which do not impair the dyestuffs to be treated.

It is known in the art to prepare highly concentrated dyestuff preparations containing water by adding to the mother liquor, in the course of the preparation of the dyestuffs or of the aqueous suspensions thereof, before or after the separation of said mother liquor, liquid compounds of the aliphatic or isocyclic series which are difficultly soluble or insoluble in water. These liquid compounds may be added in emulsified form in an amount which is insufficient for breaking the aqueous suspension and which separates the water-containing dyestuff from the liquor in the usual manner. This known process, however, is not intended to modify the dyestuffs in question. It is only intended to prepare aqueous dyestuff pastes with a content of dry substance distinctly higher than the usual 20 to 25% by weight of dry substance; besides, the reaction is not carried out at an elevated temperature. The aqueous dyestuff pastes prepared according to the known process have no connection with the above mentioned oil-based printing colours which may be prepared from the azo pigments obtained according to the present invention.

The following examples serve to illustrate the invention but they are not intended to limit it thereto.

*Example 1*

25 grams of chlorobenzene are added to 10 liters of the aqueous suspension having a dry content of 1.8% obtained in the course of the preparation of the disazo dyestuff from tetrazotized 3:3'-dichlorobenzidine and 1-acetoacetyl-amino-2-methoxybenzene (cf. dyestuff 12 of the table). The whole is then heated to 95° C. by introducing steam and this temperature is maintained for 20 minutes. Subsequently, the dyestuff is filtered off, washed and dried.

The yellow disazo dyestuff thus obtained shows an oil absorption of 60 milliliters of linseed oil/100 grams of dyestuff as against 114 milliliters of linseed oil/100 grams of dyestuff of the chemically identical product which, however, has not been subjected to the treatment described above. The viscosity value measured in the Ford viscosimeter is 80 seconds. The viscosity of an intaglio printing colour prepared from the non-treated dyestuff according to the same recipe has been so high that it could no longer be measured in a Ford viscosimeter.

The pigment treated as described above has a slightly better covering power than the non-treated one. Besides the improved oil absorption it offers still further advantages. The fastness to bleeding of a polyvinylchloride foil dyed with the dyestuff pigment treated according to the present invention is somewhat better than the fastness to bleeding of a dyeing prepared with the non-treated dyestuff pigment; the same applies to the fastness to overspraying of a nitro lacquering.

As solvent there may be used benzene, xylene, dichlorobenzene, trichlorobenzene, or nitrobenzene instead of chlorobenzene.

*Example 2*

10 grams of o-dichlorobenzene are added to 10 liters of the aqueous suspension having a dry content of 1.8% by weight obtained in the course of the preparation of the disazo dyestuff from tetrazotized 3:3'-dichlorobenzidine and 1-acetoacetylamino-2-methoxybenzene (cf. dyestuff 12 of the table) and the whole is worked up as described in Example 1.

The yellow pigment thus obtained shows an oil absorption of 80 milliliters of linseed oil/100 grams of dyestuff as against 114 milliliters of linseed oil/100 grams of dyestuff of a chemically identical product which, however, has not been modified according to the present invention. Contrary to the pigment dyestuff prepared according to Example 1, the pigment dyestuff obtained according to Example 2 is almost similar to the untreated one as concerns transparency and tinctorial strength.

On further reducing the amount of solvent, the value of oil absorption approaches that of the non-treated dyestuff.

*Example 3*

15 grams of 1:2:4-trichlorobenzene are added to a suspension of 100 grams of the disazo dyestuff prepared from 1 mol of tetrazotized 3:3'-dichlorobenzidine and 2 mols of acetoacetic acid anilide (cf. dyestuff 11 of the table) and 5 liters of water; the whole is heated for 30 minutes to a temperature between 90 and 95° C. by introducing steam. After working up, in the usual manner, a yellow pigment dyestuff showing an oil absorption of 55 milliliters of linseed oil/100 grams of dyestuff as against 96 milliliters of linseed oil/100 grams of dyestuff of the chemically identical dyestuff pigment which, however, has not been treated according to the process of the present invention, is obtained.

*Example 4*

15 grams of chlorobenzene emulsified in 5 grams of resin soap and 100 grams of water are added to an aqueous suspension of 60 grams of acetoacetic acid anilide; the whole is then coupled in the usual manner with a tetrazo solution of 42.2 grams of 3:3'-dichlorobenzidine in the presence of sodium acetate in order to obtain the dyestuff. Then, the whole is heated for one hour to a temperature between 60° C. and 70° C., filtered off, washed and dried. The product obtained (cf. dyestuff 11 of the table) shows an oil absorption of 60 milliliters of linseed oil/100 grams of dyestuff as against 98 milliliters of linseed oil/100 grams of dyestuff of the chemically identical product which, however, has not been treated according to the process of the present invention.

*Example 5*

27 grams of chlorobenzene are added to 10 liters of an aqueous suspension of the disazo dyestuff prepared from 1 mol of tetrazotized 3:3'-dichlorobenzidine and 2 mols of 1-acetoacetylamino-2:4-dimethylbenzene (cf. dyestuff 9 of the table) having a dry content of 1.5% by weight. The whole is then heated for one hour to 95° C.

The yellow pigment obtained shows an oil absorption of 60 milliliters of linseed oil/100 grams of dyestuff as against 85 milliliters of linseed oil/100 grams of dyestuff of the chemically identical product which, however, has not been treated according to the process of the present invention.

*Example 6*

150 grams of the disazo dyestuff prepared from 1 mol of tetrazotized 3:3'-dichlorobenzidine and 2 mols of acetoacetic acid anilide (cf. dyestuff 11 of the table) are suspended in 2.5 liters of water and 15 grams of benzene emulsified in water with the aid of sinarolsulfamidoacetic sodium salt (sinarol means a saturated hydrocarbon fraction having a boiling range of 180° C. to 210° C.) are added.

The whole is then heated for 40 minutes to 50° C., filtered off, washed and dried. The yellow pigment thus obtained shows an oil absorption of 75 milliliters of linseed oil/100 grams of dyestuff as against 96 milliliters of linseed oil/100 grams of dyestuff of the chemically identical product which, however, has not been treated according to the process of the present invention.

Example 7

25 parts of o-dichlorobenzene are added to a suspension of 150 grams of the monoazo dyestuff prepared from diazotized 5-chloro-2-aminotoluene and 1-(2':3'-hydroxynaphthoylamino)-4-chloro-2-methylbenzene (cf. dyestuff 8 of the table) in 2 liters of water; the whole is then heated for 30 minutes to 95° C. After working up in the usual manner, a red pigment dyestuff showing an oil absorption of 60 milliliters of linseed oil/100 grams of dyestuff as against 86 milliliters of linseed oil/100 grams of dyestuff of the chemically identical dyestuff pigment which, however, has not been treated according to the process of the present invention, is obtained.

By using benzylcyanide, methylchloroform, benzoic acid ethyl ester or quinoline instead of o-dichlorobenzene a product having the same properties is obtained.

Example 8

100 grams of the monoazo dyestuff prepared from diazotized 2:4:5-trichloro-aniline and 1-(2':3'-hydroxynaphthoylamino)-2-methylbenzene (cf. dyestuff 7 of the table) are suspended in 2 liters of water and the emulsion of 15 grams of o-dichlorobenzene in 50 grams of water is added. As emulsifier sinarolsulfamidoacetic sodium salt is used. Subsequently, the whole is heated for 1 hour to 40° C. and worked up in the usual manner. The red pigment thus obtained shows an oil absorption of 70 milliliters of linseed oil/100 grams of dyestuff as against 82 milliliters of linseed oil/100 grams of dyestuff of the nontreated dyestuff pigment. On heating for 20 minutes to a temperature between 95° C. and 100° C. instead of to 40° C. a product showing an oil absorption of 60 milliliters of linseed oil/100 grams of dyestuff, is obtained.

We claim:
1. Process for reducing the oil absorption characteristics of an azo pigment obtained by coupling a diazonium compound of a primary aromatic amine selected from the group consisting of tetrazotized 3:3'-dichlorobenzidine, diazotized 5-chloro-2-amino-toluene and diazotized 2:4:5-trichloroaniline with a coupling component selected from the group consisting of aceto acetic anilide, 1-acetoacetylamino-2-methoxy-benzene, 1-acetoacetylamino-2:4-dimethylbenzene, 1-(2':3'-hydroxynaphthoylamino)-4-chloro-2-methylbenzene and 1-(2':3'-hydroxynaphthoylamino)-2-methylbenzene, which comprises treating said azo pigment while in an aqueous suspension in a concentration of between about 1 and 10 percent by weight, with a water-insoluble organic solvent selected from the group consisting of benzene, toluene, xylene, nitrobenzene, chlorobenzene, bromobenzene, dichlorobenzene, trichlorobenzene, benzylcyanide, benzoic acid lower alkylester, quinoline, chloronaphthalene, acetonitrile and methyl chloroform in a proportion ranging from about 2 percent by weight up to about 25 percent by weight calculated on the pure azo pigment for from 5 minutes up to 3 hours at a temperature in the range from about 40° to 100° C.

2. The process as defined in claim 1, wherein the treatment of the azo pigment with the water-insoluble organic solvent is carried out in the presence of an emulsifier.

3. The process defined in claim 1, wherein the azo pigment treated at the temperature recited therein is obtained by coupling a recited diazonium compound with a recited coupling component in the presence of said water-insoluble organic solvent.

References Cited in the file of this patent

UNITED STATES PATENTS

| 2,938,897 | Armento | May 31, 1960 |
| 3,016,384 | Caliezi | Jan. 9, 1962 |

FOREIGN PATENTS

| 956,491 | Germany | Jan. 17, 1957 |